(12) United States Patent
Li

(10) Patent No.: US 7,937,592 B2
(45) Date of Patent: May 3, 2011

(54) NETWORK COMMUNICATION SECURITY PROCESSOR AND DATA PROCESSING METHOD

(75) Inventor: Jie Li, Shenzhen (CN)

(73) Assignee: ZIE Corporation, Shenzhen, Guangdong Prov. (CN)

(*) Notice: Subject to any disclaimer, the term of this patent is extended or adjusted under 35 U.S.C. 154(b) by 846 days.

(21) Appl. No.: 10/569,453

(22) PCT Filed: Jun. 2, 2004

(86) PCT No.: PCT/CN2004/000588
§ 371 (c)(1),
(2), (4) Date: Jul. 26, 2006

(87) PCT Pub. No.: WO2005/057851
PCT Pub. Date: Jun. 23, 2005

(65) Prior Publication Data
US 2007/0192621 A1    Aug. 16, 2007

(30) Foreign Application Priority Data

Aug. 26, 2003 (CN) .................................. 03 1 40366

(51) Int. Cl.
*G06F 21/00* (2006.01)
*G06F 7/04* (2006.01)
(52) U.S. Cl. ...................................... 713/189; 726/11
(58) Field of Classification Search .................. 713/189; 726/11
See application file for complete search history.

(56) References Cited

U.S. PATENT DOCUMENTS

| 5,883,956 | A  | * | 3/1999 | Le et al. ......................... 713/170 |
| 6,839,346 | B1 | * | 1/2005 | Kametani ....................... 370/389 |
| 7,017,042 | B1 | * | 3/2006 | Ziai et al. ...................... 713/161 |
| 7,107,464 | B2 | * | 9/2006 | Shapira et al. .................. 726/15 |
| 7,191,341 | B2 | * | 3/2007 | Paaske et al. ................. 713/189 |
| 7,224,795 | B2 | * | 5/2007 | Takada et al. .................. 380/42 |
| 7,373,500 | B2 | * | 5/2008 | Ramelson et al. ............ 713/150 |
| 7,403,615 | B2 | * | 7/2008 | Matthews, Jr. .................. 380/42 |
| 7,434,045 | B1 | * | 10/2008 | Enderwick et al. ........... 713/158 |
| 2002/0037079 | A1 | * | 3/2002 | Duval ............................. 380/37 |
| 2002/0188839 | A1 | * | 12/2002 | Noehring et al. ............. 713/153 |
| 2002/0188871 | A1 | * | 12/2002 | Noehring et al. ............. 713/201 |
| 2003/0014627 | A1 | * | 1/2003 | Krishna et al. ................ 713/153 |

(Continued)

FOREIGN PATENT DOCUMENTS

JP          A 2001345802        12/2001

(Continued)

OTHER PUBLICATIONS

Search Report of PCT/CN2003/000588, May 19, 2005, 2 pages.

*Primary Examiner* — Techane J Gergiso
(74) *Attorney, Agent, or Firm* — Banner & Witcoff, Ltd.

(57) ABSTRACT

The invention provides a network communication security processor and its data processing method, the security processor comprising: a data communication interface for transferring a communication data packet between the network communication security processor and an external network; a secure connection database for storing the security policy and secure connection parameters relevant to the data packet; a secure connection database operating engine for operating and maintaining the secure connection database; a multi-channel security processing engine for performing security processing on the data packet by invoking an encryption operation module; and the encryption operation module for performing encryption/decryption operations on the data packet. The invention, on the one hand, guarantees the high-speed capability of the data packet security processing, on the other hand, makes the central processor free from the security processing operations of every particular data packet and focused on the implementation of high level protocols, thus reducing the difficulty of the system development and enhancing the system reliability.

22 Claims, 3 Drawing Sheets

U.S. PATENT DOCUMENTS

| | | | |
|---|---|---|---|
| 2004/0039741 A1* | 2/2004 | Benson et al. | 707/9 |
| 2004/0039936 A1* | 2/2004 | Lai | 713/201 |
| 2004/0078568 A1* | 4/2004 | Pham et al. | 713/165 |
| 2004/0098600 A1* | 5/2004 | Eldeeb | 713/189 |
| 2004/0123119 A1* | 6/2004 | Buer et al. | 713/189 |
| 2004/0158710 A1* | 8/2004 | Buer et al. | 713/160 |
| 2004/0162992 A1* | 8/2004 | Sami et al. | 713/200 |
| 2005/0114700 A1* | 5/2005 | Barrie et al. | 713/201 |

FOREIGN PATENT DOCUMENTS

| | | |
|---|---|---|
| SE | C2 514598 | 3/2003 |
| WO | WO A 0175562 | 10/2001 |

* cited by examiner

NETWORK COMMUNICATION SECURITY PROCESSOR AND DATA PROCESSING METHOD

This application is a National Stage application of co-pending PCT application PCT/CN2004/000588 filed Jun. 2, 2004, which was published in Chinese under PCT Article 21(2) on Jun. 23, 2005, which claims priority from Chinese patent application 03140366.2 filed on Aug. 26, 2003. These applications are incorporated herein by reference in their entirety.

TECHNICAL FIELD

The present invention relates to the network communication security technology, in particular to a data processor for implementing secure communication over a network and its data processing method.

BACKGROUND OF THE INVENTION

With the rapid development of the Internet, IP networks are increasingly becoming an indispensable tool in people's daily work and life, and the demand for the security of data communication over IP networks is also becoming increasingly intensive. As is well known, IP networks are open networks, and data communication using IP networks without any safeguarding is not secure at all. To meet the demand for secure communication over IP networks, the IPSec (IP Security) working group of the Internet Engineering Task Force formulated a set of cryptography-based open network security protocols, collectively referred to as IPSec architecture. The IPSec protocols provide security services such as access control, connectionless data integrity, data privacy, data source authentication, anti-replay attack, automatic key management, etc.

At present, there are mainly two kinds of security processors for implementing network packet data encryption: one kind of security processors, such as the communication security processor of model MPC180 manufactured by Motorola Inc., only provide the function of data encryption operation per se, perform data communication with the outside world through an asynchronous data bus of 8-32 bits, and require an external processor to implement the IPSec protocols; the other kind of security processors, such as the communication security processor of model MPC190 manufactured by Motorola Inc., also only provide the function of data encryption operation per se, perform data communication with the outside world through a PCI bus, and also require an external processor to implement the IPSec protocols.

Since current network communication security processors can only perform the function of data encryption operations, and in implementing the IPSec protocols, the key needed and the algorithm to be used by the encryption operation have to be specified by the external host processor, thus the host processor has to be involved in the concrete encryption operation process, increasing the load on the host processor, enhancing the complexity of the system, augmenting the development difficulty and lowering the reliability of the system.

For a security processor performing data communication with the outside world through an asynchronous data bus, performing a read or write operation on a chip typically requires about 5 clock cycles, and this intrinsic deficiency of slow interface data transmission rate makes the chip unable to achieve a high data processing speed. For a security processor performing data communication with the outside world through a PCI bus, a high data communication speed appears to be achievable, but in practice this shared bus has low efficiency, especially when there are multiple PCI devices in the system, the use efficiency of the PCI bus will decrease greatly. This will lower the utilization of the security processor in practical use, and the data processing speed of the system is still not high. For a security processor employing a PCI interface, the system is required to provide a PCI interface, which reduces the flexibility of the system architecture.

Existing patent documents include: Chinese patent application No. 01107461.2, entitled "packet encryption chip and its high-speed data encryption and decryption method", and U.S. Pat. No. 6,477,646, entitled "Security chip architecture and implementations for cryptography acceleration".

There are the following deficiencies in the Chinese patent application No. 01107461.2: firstly, this patent uses a PCI bus interface to transmit data, and since a PCI bus is a shared bus, when there are multiple PCI interfaces in the system, the bus transmission efficiency must necessarily be low, and the interface data transmission rate is restricted; in addition, the network security processing system must be coupled electrically with the network application system through the PCI bus, which also restricts the composition of the network application system. Secondly, in the implementation of this patent, the implementation of the network security protocols from the negotiation of the network secure connection to the encryption and decryption of each data packet and the identity authentication processing must be participated in and controlled by the central processor, thus increasing the load on the host processor, enhancing the complexity of the system, augmenting the development difficulty and lowering the reliability of the system.

There are the following deficiencies in the U.S. Pat. No. 6,477,646: in this patent, the implementation of the network security protocols from the negotiation of the network secure connection to the encryption and decryption of each data packet and the identity authentication processing must be participated in and controlled by the central processor, thus increasing the load on the host processor, enhancing the complexity of the system, augmenting the development difficulty and lowering the reliability of the system.

SUMMARY OF THE INVENTION

The object of the invention is to provide a network communication security processor with independent functions and high data processing speed, and its data processing method.

The invention adopts the technical solution where the inventive network communication security processor comprises: a data communication interface for transferring a communication data packet between the network communication security processor and an external network; an encryption operation module for performing encryption/decryption operations on the data packet; the network communication security processor further comprises: a secure connection database for storing the security policies and secure connection parameters relevant to the data packet; a secure connection database operating engine for operating and maintaining the secure connection database; and a multi-channel security processing engine for performing security processing on the data packet by invoking the encryption operation module.

Preferably, the secure connection database further comprises: a command and parameter resolving module for resolving an entered command and parameters to analyze the operation to be performed; an address computing module for computing the address of a database storage location using a lookup-table algorithm according to the resolving results of the command and parameter resolving module; a lookup-table key retrieval module for retrieving the lookup-table key of the database storage location from an external memory according to the address as computed by the address computing module; a lookup-table key comparison module for comparing the lookup-table key retrieved by the lookup-table key retrieval module and the lookup-table key in the data packet to determine whether the database storage location is a correct one; a database operating module for performing the operation as determined by the command and parameter resolving module on the correct database storage location; and a lookup-table result returning module for returning the operation results of the database operating module.

Preferably, the secure connection database operating engine further comprises: a database operating command resolving module for resolving a database operating command and parameters; a database operating microprogram module for performing an operation on the secure connection database according to the results of the resolving on the database operating command and parameters by the database operating command resolving module; and a database operating result sending back module for sending back the database operating results of the database operating microprogram module to the multi-channel security processing engine.

Preferably, the multi-channel security processing engine further comprises: a security processing channel module comprising multiple security processing channels, each of which comprises a security parameter resolver and a security processing microprogram module; the security parameter resolver being for resolving the security parameters of the data packet and initiating the security processing microprogram module; and the security processing microprogram module being for invoking the encryption operation module to perform security processing on the data packet.

Preferably, the network communication security processor further comprises: a central processor for configuring and managing the network communication security processor, and performing the negotiation of a secure connection and the processing of high-level security protocols; an incoming data packet selector for selecting data packets on which security processing need to be performed from the data communication interface and the central processor; and an outgoing data packet selector for selecting sending directions for data packets from the multi-channel security processing engine and the incoming data packet selector.

Preferably, the network communication security processor further comprises: an incoming and outgoing data packet dual-port cache for caching data packets incoming to and outgoing from the network communication security processor received and sent by the data communication interface and their status information; and a security processing data packet dual-port cache for caching data packets on which security processing is to be performed from the incoming data packet selector and their security processing parameters.

Preferably, the network communication security processor further comprises: an information exchange interface for exchanging configuration, management and control information with the outside world; a public key operation module for performing public key operations; a random pseudo number generator; and a peripheral module for providing a fitted memory interface and communication interface for the central processor.

Preferably, the security connection database further comprises: a secure connection database interface register bank for storing commands and parameters from the secure connection database operating engine to be provided to the command and parameter resolving module, and for storing the information from the lookup-table result returning module to be forwarded to the secure connection database operating engine; and a memory interface for connecting the secure connection database with the external memory.

Preferably, the secure connection database operating engine further comprises: a central processor interface register bank for providing an operating interface of the central processor to the secure connection database operating engine, through which the secure connection database operating engine sends the request to establish a secure connection and the relevant parameters to the central processor; an incoming data packet selector interface register bank for caching data packets traveling to and fro between the incoming data packet selector and the secure connection database operating engine and the relevant information; and a database operating command and parameter cache module for caching database operating commands and parameters from the central processor interface register bank and the incoming data packet selector interface register bank, and for providing them to the database operating command resolving module.

Preferably, the multi-channel security processing engine further comprises: a security processing data packet dual-port cache interface register bank through which the multi-channel security processing engine performs operations on the security processing data packet dual-port cache in order to retrieve therefore a data packet on which security processing needs to be performed and its security processing parameters; an encryption operation interface register bank through which the security processing micro-program invokes the encryption operation module; a security processing channel data packet temporary memory module for storing temporarily the data of data packets during the security processing of the security processing channels; and an outgoing data packet selector interface register bank for storing the data packets after the security processing by the security processing channels and which can be retrieved by the outgoing data packet selector.

Preferably, the various components of the network communication security processor are on the same chip.

Preferably, the encryption operation module comprises an encryption algorithm operation module for performing encryption/decryption operations on the data packet and a hash algorithm operation module for performing hash operations on the data packet.

Preferably, the data communication interface comprises multiple physical interface, each of which is an Ethernet interface or a POS interface; the information exchange interface is a PCI bus interface or an asynchronous data bus interface.

Furthermore, a data processing method of the present invention employing the network communication security processor comprises the following steps: the data communication interface receiving a data packet from an external network; the secure connection database operating engine looking up the information corresponding to the received data packet in the secure connection database; determining the processing to be performed on the data packet according to the results of the looking up; and when it is determined that security processing needs to be performed on the data packet, the multi-channel security processing engine performing the data security processing on the data packet.

Preferably, the looking up step further comprises: the secure connection database operating engine extracting a lookup-table key from the received data packet; the secure connection database operating engine looking up the security policy and secure connection parameters corresponding to the received data packet in the secure connection database according to the lookup-table key; and the secure connection database operating engine returning the results of the looking up.

Preferably, the determining step further comprises: determining the results of the looking up: if there is no security policy corresponding to the data packet in the secure connection database, sending the data packet to the data communication interface for sending out; if there is a security policy corresponding to the data packet in the secure connection database, but the security policy is to prohibit the passage of the data packet, discarding the data packet; and if there is a security policy corresponding to the data packet in the secure connection database, and the security policy is to allow the passage of the data packet, determining whether there is any available secure connection corresponding to the data packet according to the secure connection parameters, and if there is no available secure connection, discarding the data packet and sending a request for establishing a secure connection, while if there is an available secure connection, determining that security processing needs to be performed on the data packet.

Preferably, the step of performing the data security processing further comprises: the multi-channel security processing engine invoking the encryption operation module to perform encryption/decryption operations on the data packet; the multi-channel security processing engine sending out the processed data packet through the data communication interface.

Preferably, the network communication security processor further comprises an incoming and outgoing data packet dual-port cache, and the receiving step further comprises: the data communication interface storing the received data packet into the incoming and outgoing data packet dual-port cache, and rewriting the status information of the incoming and outgoing data packet dual-port cache.

Preferably, the network communication security processor further comprises an incoming data packet selector, and the looking up step further comprises: the incoming data packet selector retrieving the received data packet from the incoming and outgoing data packet dual-port cache; the incoming data packet selector invoking the secure connection database operating engine according to the information of the data packet; the secure connection database operating engine extracting a lookup-table key from the received data packet; the secure connection database operating engine looking up the security policy and secure connection parameters corresponding to the received data packet in the secure connection database according to the lookup-table key; and the secure connection database operating engine returning the results of the looking up to the incoming data packet selector.

Preferably, the network communication security processor further comprises an incoming data packet selector, an outgoing data packet selector, a central processor and a security processing data packet dual-port cache, and the determining step further comprises: the incoming data packet selector determining the results of the looking up: if there is no security policy corresponding to the data packet in the secure connection database, sending out the data packet through the outgoing data packet selector; if there is a security policy corresponding to the data packet in the secure connection database, but the security policy is to prohibit the passage of the data packet, discarding the data packet; and if there is a security policy corresponding to the data packet in the secure connection database, and the security policy is to allow the passage of the data packet, the incoming data packet selector determining whether there is any available secure connection corresponding to the data packet according to the secure connection parameters, and if there is no available secure connection, discarding the data packet and sending to the central processor a request for establishing a secure connection, while if there is an available secure connection, storing the data packet into the security processing data packet dual-port cache.

Preferably, the step of performing the data security processing further comprises: the multi-channel security processing engine extracting the data packet from the security processing data packet dual-port cache; the multi-channel security processing engine invoking the encryption operation module to perform encryption/decryption operations on the data packet; the multi-channel security processing engine sending the processed data packet to the outgoing data packet selector; and the outgoing data packet selector determining the sending direction for the data packet according to the destination address of the data packet.

Compared to the prior art, the present invention introduces a secure connection database, a secure connection database operating engine, and a multi-channel security processing engine, allowing the security processing of data packets mainly performed by network communication security processor hardware circuit, thus on the one hand guaranteeing the high-speed capability of the data packet security processing, on the other hand making the central processor free from the security processing operations on each particular data packet and focused on implementing high level protocols, thereby reducing the difficulty of the system development and enhancing the system reliability.

Additionally, the present invention provides a standard high-speed physical communication interface, making the data transmission rate of the interface no longer a bottleneck constraining the data processing speed; the present invention, by using a standard physical communication interface, allows the network communication security processor to be directly inserted between the protected network and an external larger network in order to implement a network security protocol, without need to consider reserving an interface for the network communication security processor, thereby enhancing the flexibility in the system design.

PREFERRED EMBODIMENTS OF THE INVENTION

The network communication security processor of the present invention and its data processing method will be described below with reference to the accompanying drawings.

Figure 1:
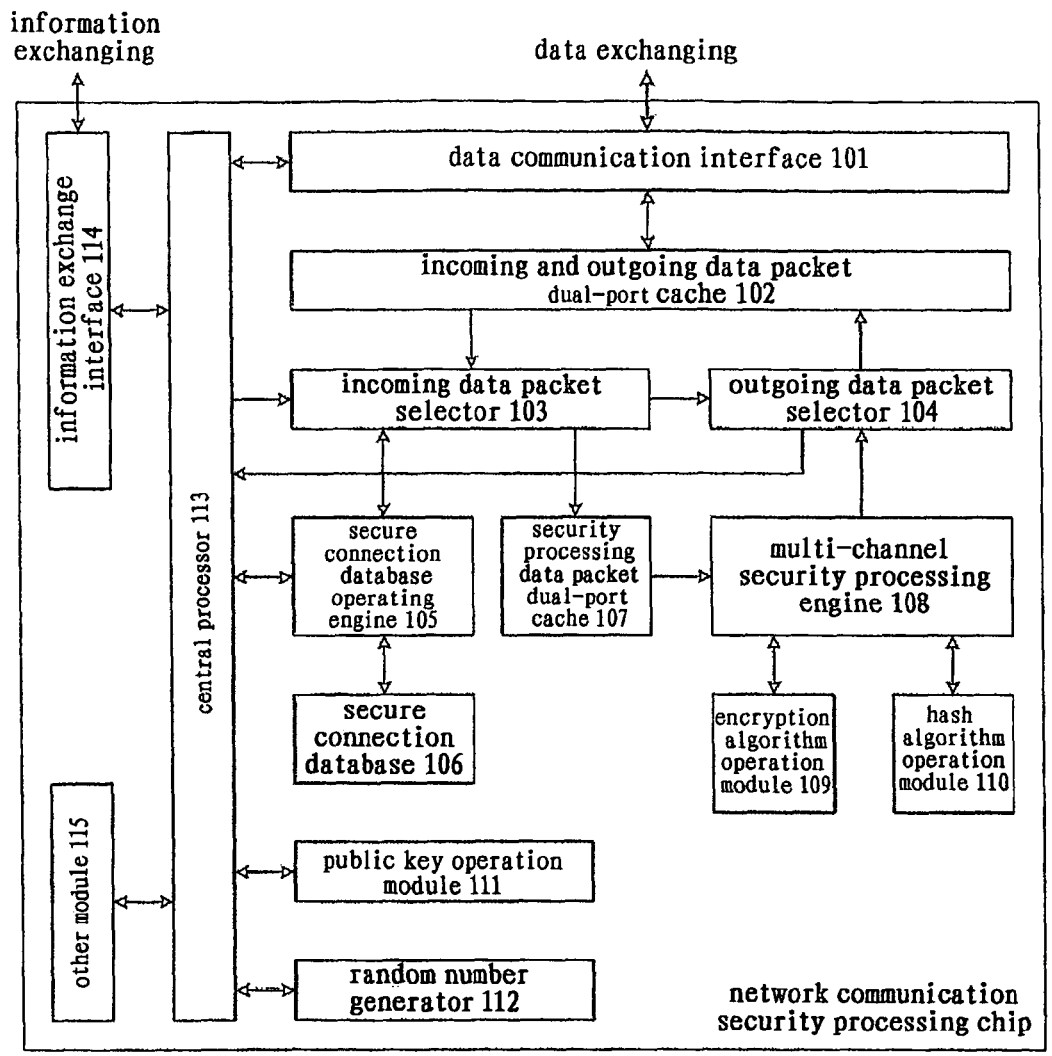
FIG. 1 is a schematic structural diagram of the network communication security processor of the present invention.

As shown in FIG. 1, the network communication security processor (or referred to as network communication security processing chip, abbreviated as chip, not numbered) of the present invention comprises:

A data communication interface 101, comprising multiple physical interfaces to connect to different networks, is the data channel through which network data packets come into and go out of the chip. In the data receiving direction, the data frames received from a physical interface is formed into a data packet by removing the communication interface encapsulation, which is stored in an incoming and outgoing data packet dual-port cache 102 together with the status information of the data packet; in the data sending direction, the data packet is retrieved according to the status information from the incoming and outgoing data packet dual-port cache 102, and after added with the communication interface encapsulation, is sent at the corresponding physical interface. A physical interface refers to a concrete data communication interface entity, including an Ethernet interface, a POS interface or another interface capable of being used for exchanging data.

An incoming and outgoing data packet dual-port cache 102 for caching the data packets coming into and going out of the chip and their status information, including such information as the lengths of the data packet and the storage addresses, etc.

An incoming data packet selector 103 for retrieving an incoming data packet from the incoming and outgoing data packet dual-port cache 102 and forwarding it to various modules in the chip. If the central processor 113 needs to send a data packet, it also delivers the data packet into the incoming data packet selector 103. The incoming data packet selector 103 retrieves a data packet from the incoming and outgoing data packet dual-port cache 102, invokes a secure connection database operating engine 105 to look up a relevant security policy in a secure connection database 106 by using the information of the data packet (e.g., the source IP address, destination IP address, name, source port, destination port, protocol type, or security parameter index etc.), and if there is a hit security policy, checks to see whether the security policy for the data packet is to prohibit the passage of the data packet or to perform the security processing. If the security policy for the data packet is to prohibit the passage, then the data packet is discarded. If the security policy for the data packet is to perform the security processing, it is checked to see whether there is a relevant secure connection, and if there is the secure connection, the secure connection parameters (including the protocol, the algorithm and key used, etc.) are retrieved, and together with the data packet and its status information are stored in the security processing data packet dual-port cache 107; if the security policy is found, but it is found that the secure connection has not yet been established, the data packet is discarded and a request to establish a secure connection is sent to the central processor 113; if no relevant security policy is found, indicating the data packet is one that does not need security processing, the data packet is transferred to the outgoing data packet selector 104.

An outgoing data packet selector 104 for collecting data packets to be sent from the incoming data packet selector 103 and multi-channel security processing engine 108, judging whether its destination IP address is the IP address of native machine, and if yes, transferring the data packet to the central processor 113; if the destination IP address of the data packet is not the IP address of native machine, storing the data packet together with its status information into the incoming and outgoing data packet dual-port cache 102.

A secure connection database operating engine 105 responsible for operating and maintaining the secure connection database 106, including retrieving, adding and removing the data in a secure connection database storage location.

A secure connection database 106 comprises a security policy database and a secure connection parameter database. The security policy database stores the selection information and security processing policies for data packets. The secure connection parameter database stores the parameters of the established secure connections.

A security processing data packet dual-port cache 107 for caching the data packets on which security processing is to be performed and their security processing parameters and status information.

A multi-channel security processing engine 108 for reading the security processing parameters according to the status information in the security processing data packet dual-port cache 107, invoking an encryption algorithm operation module 109 and a hash algorithm operation module 110 to perform the security processing on the data packet; and delivering the data packet after the security processing to the outgoing data packet selector 104.

An encryption algorithm operation module 109 for performing encryption/decryption operations.

A hash algorithm operation module 110 for performing hash operations.

A public key operation module 111 for performing a public key algorithm.

A random number generator 112 for generating pseudo-random numbers.

A central processor 113 for exchanging management and control information with the outside world through an information exchange interface 114 or a data communication interface 101; negotiating to establish a secure connection and managing the secure connection database 106 by invoking the random number generator 112, public key operation module 111 and network secure connection database operation engine 105 to implement the high-level network security protocols; in addition, the central processor 113 further having the function of performing initialization configuration and management on the various modules inside the chip.

An information exchange interface 114 for providing information exchange (including secure connection database information) between the chip and the outside world, and not as a data communication interface. The information exchange interface 114 can be a PCI bus interface, asynchronous data bus interface or another interface capable of being used for exchanging data.

Peripheral module (or referred to as other module) 115 comprising modules fitted to the central processor 113, such as a memory interface, RS232 communication interface.

The incoming and outgoing data packet dual-port cache 102 is electrically coupled with the data communication interface 101, the incoming data packet selector 103, and the outgoing data packet selector 104 respectively; the incoming data packet selector 103 is electrically coupled with the central processor 113, the incoming and outgoing data packet dual-port cache 102, and outgoing data packet selector 104, the secure connection database operating engine 105 and the security processing data packet dual-port cache 107 respectively; the outgoing data packet selector 104 is electrically coupled with the incoming and outgoing data packet dual-port cache 102, the incoming data packet selector 103, the central processor 113, and the multi-channel security processing engine 108 respectively; the secure connection database operating engine 105 is electrically coupled with the incoming data packet selector 103, the central processor 113, and the secure connection database 106 respectively; the security processing data packet dual-port cache 107 is electrically coupled with the incoming data packet selector 103 and the multi-channel security processing engine 108 respectively; the multi-channel security processing engine 108 is electrically coupled with the outgoing data packet selector 104, the security processing data packet dual-port cache 107, the encryption algorithm operation module 109, and the hash algorithm operation module 110 respectively; the central processor 113 is electrically coupled with the data communication interface 101, the incoming data packet selector 103, the outgoing data packet selector 104, the secure connection database operating engine 105, the public key operation module 111, the random number generator 112, the information exchange interface 114, and the other module 115 respectively.

Figure 2:
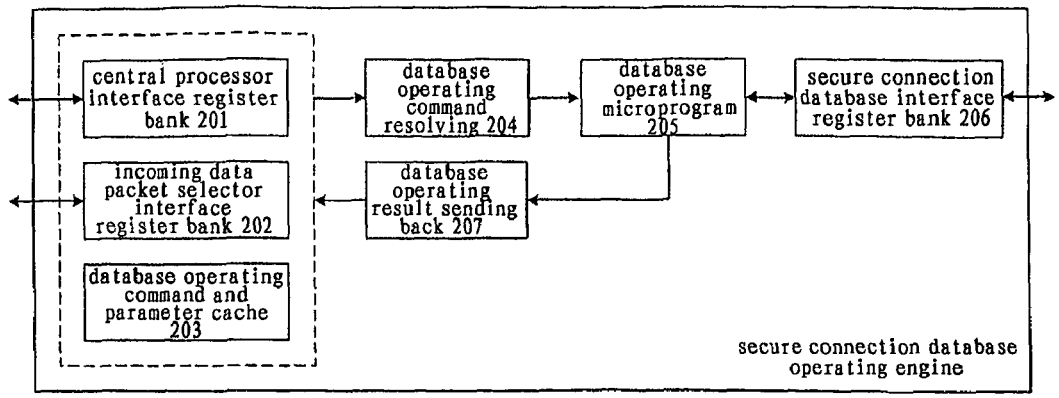
FIG. 2 is a schematic structural diagram of the secure connection database operating engine of the present invention.

As shown in FIG. 2, the secure connection database operating engine 105 mainly comprises the following components:

A central processor interface register bank 201, through which the central processor 113 performs operations on the secure connection database operating engine 105; and through which the secure connection database operating engine 105 sends a request for establishing a secure connection and transfers relevant information to the central processor 113.

An incoming data packet selector interface register bank 202 through which the incoming data packet selector 103 looks up the security policy and secure connection parameters for a data packet.

A database operating command and parameter cache module 203 for caching database operating commands and their parameters from the central processor interface register bank 201 and the incoming data packet selector interface register bank 202.

A database operating command resolving module 204 for resolving a command in the database operating command and parameter cache module 203 and initiating a database operating microprogram module 205.

A database operating microprogram module 205 for performing various database operating commands and responsible for the maintenance of secure connections (including operations such as shifting of the sliding windows and aging processing of the secure connections, etc.).

A secure connection database interface register bank 206 through which the secure connection database operating engine 105 performs specific operations on the secure connection database 106.

A database operating result sending back module 207 for refreshing the status register banks in the central processor interface register bank 201 and the incoming data packet selector interface register bank 202.

Figure 3:
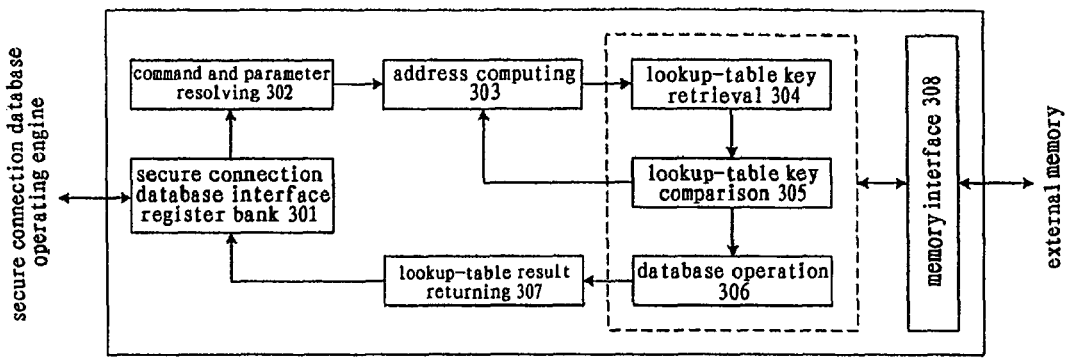
FIG. 3 is a schematic structural diagram of the secure connection database of the present invention.

As shown in FIG. 3, the secure connection database mainly comprises the following components:

A secure connection database interface register bank 301 used as the database operating interface register bank of the secure connection database operating engine 105.

A command and parameter resolving module 302 for resolving the entered command and parameters, analyzing the required operation, and controlling the subsequent course of operations.

An address computing module 303 for computing the address of a database storage location according to a lookup-table algorithm.

A lookup-table key retrieval module 304 for retrieving the lookup-table key of a database storage location from a external memory (not numbered) through a memory interface 308.

A lookup-table key comparison module 305 for comparing the table-lookup key retrieved from the database storage location and the lookup-table key from the secure connection database interface register bank 301, the equality of which indicates that a correct database storage location has been found, otherwise the address of the database storage location will be recomputed.

A database operating module 306 for performing a database operation on the right database storage location after it has been found.

A lookup-table result returning module 307 for returning the lookup-table results after the database operation is completed.

A memory interface 308 used as an interface to the external memory.

Figure 4:
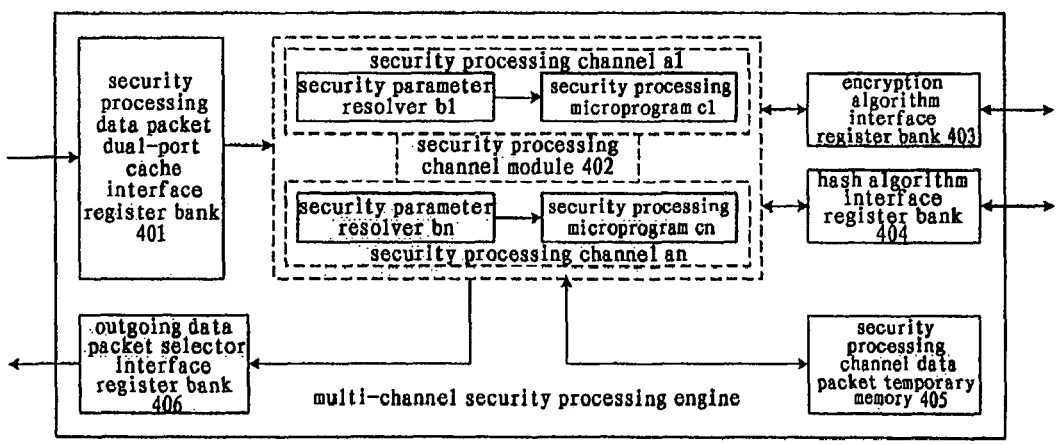
FIG. 4 is a schematic structural diagram of the multi-channel security processing engine of the present invention.

As shown in FIG. 4, the multi-channel security processing engine 108 mainly comprises the following components:

A security processing data packet dual-port cache interface register bank 401, through which the multi-channel security processing engine 108 performs operations on the security processing data packet dual-port cache 107 in order to retrieve therefrom a data packet on which security processing needs to be performed and its security processing parameters.

A security processing channel module 402, comprising multiple security processing channels $a_1$-$a_n$ which consist of the respective security parameter resolvers $b_1$-$b_n$ and security processing microprogram modules $c_1$-$c_n$, the security parameter resolvers $b_1$-$b_n$ resolving the security parameters of the data packet and initiating the corresponding security processing microprogram modules $c_1$-$c_n$ to invoke the encryption algorithm operation module 109 and the hash algorithm operation module 110 to perform security processing on the data packet.

An encryption algorithm interface register bank 403 through which the security processing microprogram modules $c_1$-$c_n$ invoke the encryption algorithm operation module 109.

A hash algorithm interface register bank 404 through which the security processing microprogram modules $c_1$-$c_n$ invoke the hash algorithm operation module 110.

A security processing channel data packet temporary memory module 405 for storing temporarily the data of the data packets in the security processing of the security processing channels $a_1$-$a_n$.

An outgoing data packet selector interface register bank 406 through which the security processing channels $a_1$-$a_n$ transfer the data packets after the security processing to the outgoing data packet selector 104.

Figure 5:
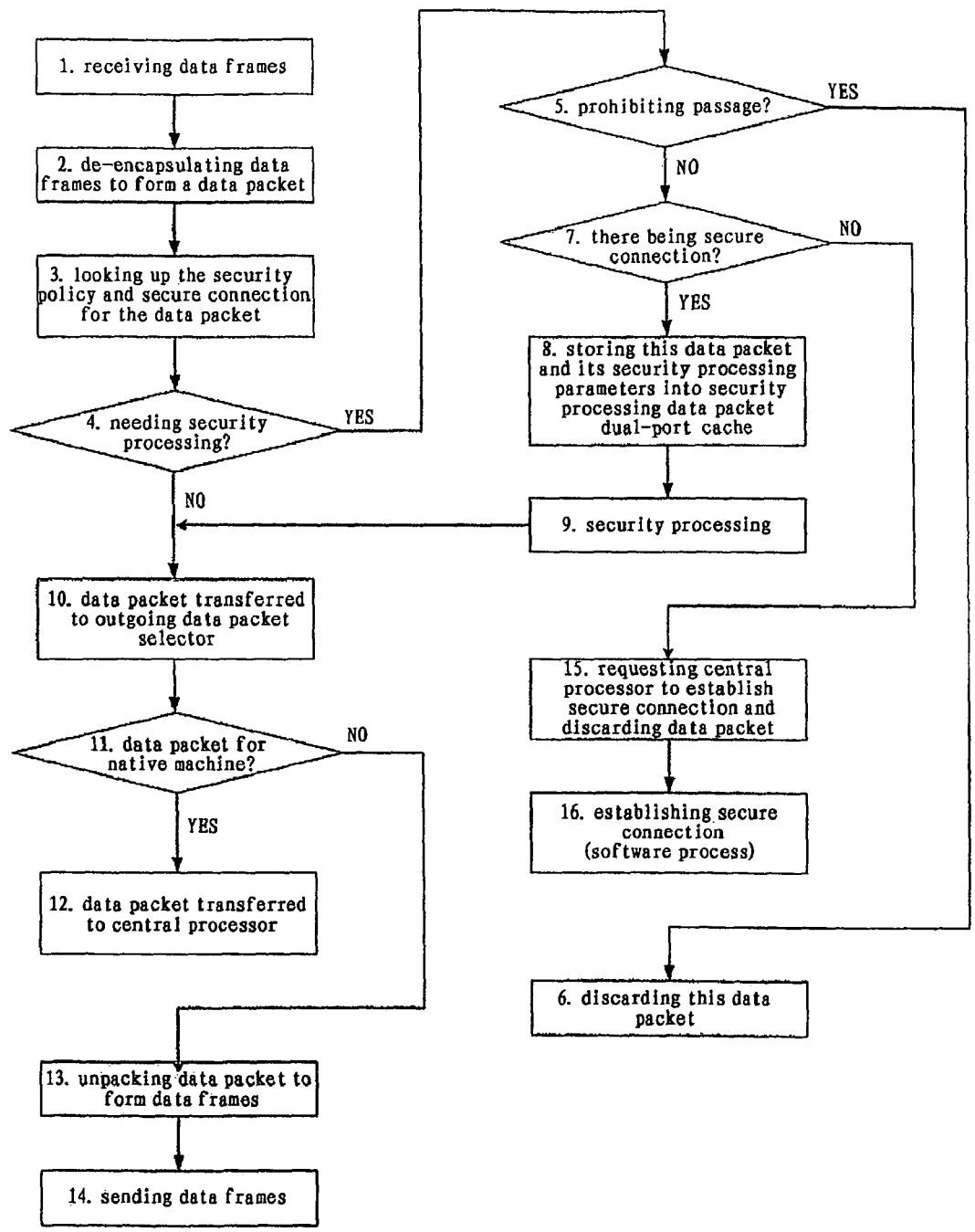
FIG. 5 is a flow chart of the data processing method of the present invention.

As shown in FIG. 5, the flow of the data processing method for a data packet incoming to the inventive network communication security processor is as follows:

Step 1: receiving data frames, wherein the data communication interface 101 of the network communication security processor provides a standard physical interface for receiving data frames from a larger network or another protected network.

Step 2: de-encapsulating and forming a data packet, wherein the data communication interface 101 of the network communication security processor, after receiving data frames in various formats, must perform the corresponding de-encapsulation of the interface data format, extract the data therein to form data packets. After forming a complete data packet, the data communication interface 101 stores it into the incoming and outgoing data packet dual-port cache 102, and rewrite the status information of the incoming and outgoing data packet dual-port cache 102 (including the length of the data packet and its storage address in the incoming and outgoing data packet dual-port cache 102).

Step 3: looking up the security policy and secure connection information for the data packet, wherein the incoming data packet selector 103, based on the information for the data packet, invokes the secure connection database operating engine 105 to look up in the secure connection database 106 to see whether there is any corresponding security policy and secure connection.

Step 4: determining whether the data packet needs security processing, wherein the incoming data packet selector 103, based on the data returned by the secure connection database operating engine 105, determines whether there is any security policy for the data packet. If there is a security policy for the data pocket, the next step proceeds to Step 5, otherwise proceeds to Step 10.

Step 5: determining whether passage is prohibited, wherein it is determined whether the security policy for the data packet is to prohibit passage or to perform security processing, and if it is to prohibit passage, the next step proceeds to Step 6, while if it is to perform security processing, the next step proceeds to Step 7.

Step 6: discarding the data packet and the process flow ending.

Step 7: determining whether there is any secure connection, wherein it is determined whether there is any available secure connection for the data packet, and if there is not, the next step proceeds to Step 15, while if there is, the next step proceeds to Step 8.

Step 8: storing the data packet and its secure connection parameters into the security processing data packet dual-port cache 107, wherein the incoming data packet selector 103 stores the data packet and its security processing parameters into the security processing data packet dual-port cache 107.

Step 9: performing security processing, wherein the multi-channel security processing engine 108 retrieves the data packet and its security processing parameters from the security processing data packet dual-port cache 107, and initiates one of the security processing channels $a_1$-$a_n$ to perform the security processing.

Step 10: the data packet being transferred to the outgoing data packet selector 104.

Step 11: determining whether the data packet is for native machine, wherein the outgoing data packet selector 104 determines whether the destination IP address of the data packet is the IP address of the native machine, and if it is not the IP address of the native machine, Step 13 is performed, while if it is the IP address of the native machine, Step 12 is performed.

Step 12: the data packet being transferred to the central processor 113, wherein the data packet is transferred to the central processor 113 for processing.

Step 13: unpacking the data packet to form data frames, wherein the data packet is stored into the incoming and outgoing data packet dual-port cache 102, and then is unpacked into an appropriate size, to which is added an encapsulation of a data format to form data frames by the data communication interface 101.

Step 14: sending the data frames, wherein the data communication interface 101 sends out the data frames from the corresponding physical interface according to the interface communication protocol, and the process flow ends.

Step 15: requesting the central processor 113 to establish a secure connection and discard the data packet, wherein for a data packet that needs security processing but for which there is no secure connection, its security policy parameters are transferred to the central processor 113 in order to request the central processor 113 to establish a relevant secure connection, while the data packet is discarded.

Step 16: establishing a secure connection, wherein the central processor 113 performs a secure connection negotiation process, in which the random number generator 112 can be invoked to generate a security key and the public key operation module 111 can be invoked to perform key exchange as needed, and the process flow ends.

The invention claimed is:

1. A network communication security processor, comprising:
    a data communication interface apparatus configured to transfer a communication data packet between the network communication security processor and an external network;
    a secure connection database configured to store a security policy and a secure connection parameter relevant to the data packet;
    memory storing computer readable instructions that, when executed, cause the network communication security processor to provide:
    an encryption operation module configured to perform encryption and decryption operations on the data packet;
    a secure connection database operating engine configured to operate and maintain the secure connection database; and
    a multi-channel security processing engine configured to perform security processing on the data packet according to the security policy stored in the secure connection database by invoking the encryption operation module,
    wherein the secure connection database further comprises:
        a command and parameter resolving module configured to resolve an entered command and parameters to analyze an operation to be performed;
        an address computing module configured to compute an address of a database storage location using a lookup-table algorithm according to a result of the resolving performed by the command and parameter resolving module;
        a lookup-table key retrieval module configured to retrieve a lookup-table key of the database storage location from an external memory according to the address as computed by the address computing module;
        a lookup-table key comparison module configured to compare the lookup-table key retrieved by the lookup-table key retrieval module and a lookup-table key in the data packet to determine whether the database storage location is correct;
        a database operating module configured to perform the operation as analyzed by the command and parameter resolving module on a correct database storage location; and
        a lookup-table result returning module configured to return operation results of the database operating module.

2. The network communication security processor of claim 1, wherein the secure connection database operating engine further comprises:
    a database operating command resolving module configured to resolve a database operating command and parameters;
    a database operating microprogram module configured to perform an operation on the secure connection database according to a result of the resolving on the database operating command and parameters by the database operating command resolving module; and a database operating result sending back module configured to send back a database operating result of the database operating microprogram module to the multi-channel security processing engine.

3. The network communication security processor of claim 2, wherein the multi-channel security processing engine further comprises:
   a security processing channel module comprising multiple security processing channels, each of which comprises a security parameter resolver and a security processing microprogram module,
   wherein the security parameter resolver is configured to resolve security parameters of the data packet and to initiate the security processing microprogram module, and
   wherein the security processing microprogram module is configured to invoke the encryption operation module to perform security processing on the data packet.

4. The network communication security processor of claim 3, further comprising:
   a central processor configured to configure and manage the network communication security processor, to perform negotiations of a secure connection and to process high-level security protocols.

5. The network communication security processor of claim 4, further comprising:
   an incoming data packet selector configured to select data packets on which security processing needs to be performed from the data communication interface and the central processor; and
   an outgoing data packet selector configured to select sending directions for data packets from the multi-channel security processing engine and the incoming data packet selector.

6. The network communication security processor of claim 5, further comprising:
   an incoming and outgoing data packet dual-port cache for caching data packets incoming to and outgoing from the network communication security processor, wherein the data packets are received and sent by the data communication interface with the data packets' associated status information; and
   a security processing data packet dual-port cache for caching data packets on which security processing is to be performed from the incoming data packet selector and for caching the data packets' security processing parameters.

7. The network communication security processor of claim 6, wherein the security connection database further comprises:
   a secure connection database interface register bank configured to:
      store commands and parameters from the secure connection database operating engine that are to be provided to the command and parameter resolving module, and
      to store the information from the lookup-table result returning module that is to be forwarded to the secure connection database operating engine; and
   a memory interface for connecting the secure connection database with the external memory.

8. The network communication security processor of claim 6, wherein the secure connection database operating engine further comprises:
   a central processor interface register bank configured to provide an operating interface of the central processor to the secure connection database operating engine, through which the secure connection database operating engine sends a request to establish a secure connection and the relevant parameter to the central processor;
   an incoming data packet selector interface register bank configured to cache data packets traveling between the incoming data packet selector and the secure connection database operating engine and to cache relevant information associated with the data packets; and
   a database operating command and parameter cache module configured to cache database operating commands and parameters from the central processor interface register bank and the incoming data packet selector interface register bank, and to provide the database operating commands and parameters to the database operating command resolving module.

9. The network communication security processor of claim 6, wherein the multi-channel security processing engine further comprises:
   a security processing data packet dual-port cache interface register bank through which the multi-channel security processing engine performs operations on the security processing data packet dual-port cache to retrieve therefrom a data packet on which security processing needs to be performed and the data packet's security processing parameters;
   an encryption operation interface register bank through which the security processing microprogram invokes the encryption operation module;
   a security processing channel data packet temporary memory module configured to temporarily store data of data packets during the security processing of the security processing channels; and
   an outgoing data packet selector interface register bank configured to store the data packets after the security processing by the security processing channels, wherein the data packets are retrievable by the outgoing data packet selector.

10. The network communication security processor of claim 4, further comprising:
    an information exchange interface configured to configure, manage and control information with an outside world;
    a public key operation module configured to perform public key operations;
    a random number generator configured to generate pseudo-random numbers; and
    a peripheral module configured to provide a fitted memory interface and communication interface for the central processor.

11. The network communication security processor of claim 10, wherein the information exchange interface includes at least one of: a PCI bus interface and an asynchronous data bus interface.

12. The network communication security processor of claim 1, wherein the data communication interface comprises multiple physical interfaces, each of which includes at least one of: an Ethernet interface or a POS interface.

13. The network communication security processor of claim 1, wherein the encryption operation module comprises an encryption algorithm operation module configured to perform encryption and decryption operations on the data packet and a hash algorithm operation module configured to perform hash operations on the data packet.

14. The network communication security processor of claim 1, wherein the network communication security processor is located on a single chip.

15. A data processing method employing a network communication security processor, the method comprising:
   receiving, by a data communication interface of the network communication security processor, a data packet from an external network;
   looking up, by a secure connection database operating engine of the network communication security processor, information corresponding to the received data packet in a secure connection database;
   determining processing to be performed on the data packet according to a result of the looking up in the secure connection database; and
   in response to said determination, performing data security processing, by a multi-channel security processing engine of the network communication security processor, data security processing on the data packet,
   wherein the secure connection database comprises:
      a command and parameter resolving module configured to resolve an entered command and parameters to analyze an operation to be performed;
      an address computing module configured to compute an address of a database storage location using a lookup-table algorithm according to a result of the resolving performed by the command and parameter resolving module;
      a lookup-table key retrieval module configured to retrieve a lookup-table key of the database storage location from an external memory according to the address as computed by the address computing module;
      a lookup-table key comparison module configured to compare the lookup-table key retrieved by the lookup-table key retrieval module and a lookup-table key in the data packet to determine whether the database storage location is correct;
      a database operating module configured to perform the operation as analyzed by the command and parameter resolving module on a correct database storage location; and
      a lookup-table result returning module configured to return operation results of the database operating module.

16. The data processing method of claim 15, wherein looking up the information corresponding to the received data packet includes:
   the secure connection database operating engine extracting the lookup-table key from the received data packet;
   the secure connection database operating engine looking up a security policy and secure connection parameters corresponding to the received data packet in the secure connection database according to the lookup-table key; and
   the secure connection database operating engine returning a result of the looking up of the security policy and the secure connection parameters.

17. The data processing method of claim 15, wherein determining the processing to be performed on the data packet includes:
   determining the result of the looking up and:
   if there is no security policy corresponding to the data packet in the secure connection database, sending the data packet to the data communication interface for sending out;
   if there is a security policy corresponding to the data packet in the secure connection database, but the security policy prohibits passage of the data packet, discarding the data packet; and
   if there is a security policy corresponding to the data packet in the secure connection database, and the security policy allows passage of the data packet, determining whether there is an available secure connection corresponding to the data packet according to the secure connection parameters, and
   if there is no available secure connection, discarding the data packet and sending a request for establishing a secure connection, while
   if there is an available secure connection, determining that security processing needs to be performed on the data packet.

18. The data processing method of claim 15, wherein performing the data security processing includes:
   the multi-channel security processing engine invoking an encryption operation module of the network communication security processor to perform encryption and decryption operations on the data packet; and
   the multi-channel security processing engine sending out the processed data packet through the data communication interface.

19. The data processing method of claim 15, wherein the network communication security processor further comprises an incoming and outgoing data packet dual-port cache, and wherein receiving the data packet includes:
   the data communication interface storing the received data packet into the incoming and outgoing data packet dual-port cache, and
   the data communication interface rewriting status information of the incoming and outgoing data packet dual-port cache.

20. The data processing method of claim 19, wherein the network communication security processor further comprises an incoming data packet selector and wherein looking up the information corresponding to the received data packet in the secure connection database further includes:
   the incoming data packet selector retrieving the received data packet from the incoming and outgoing data packet dual-port cache;
   the incoming data packet selector invoking the secure connection database operating engine according to the information of the data packet;
   the secure connection database operating engine extracting the lookup-table key from the received data packet;
   the secure connection database operating engine looking up a security policy and secure connection parameters corresponding to the received data packet in the secure connection database according to the lookup-table key; and
   the secure connection database operating engine returning a result of the looking up to the incoming data packet selector.

21. The data processing method of claim 15, wherein the network communication security processor further comprises an incoming data packet selector, an outgoing data packet selector, a central processor and a security processing data packet dual-port cache and wherein determining the processing to be performed on the data packet includes:
   the incoming data packet selector determining the result of the looking up of information corresponding to the received data packet and
   if there is no security policy corresponding to the data packet in the secure connection database, sending out the data packet through the outgoing data packet selector;
   if there is a security policy corresponding to the data packet in the secure connection database, but the security policy prohibits passage of the data packet, discarding the data packet; and if there is a security policy corresponding to the data packet in the secure connection database and the security policy allows passage of the data packet, the incoming data packet selector determining whether there is an available secure connection corresponding to the data packet according to the secure connection parameters, and if there is no available secure connection, discarding the data packet and sending to the central processor a request to establish a secure connection, while if there is an available secure connection, storing the data packet into the security processing data packet dual-port cache.

22. The data processing method of claim 21, wherein performing the data security processing includes:

the multi-channel security processing engine extracting the data packet from the security processing data packet dual-port cache;

the multi-channel security processing engine invoking an encryption operation module to perform encryption and decryption operations on the data packet;

the multi-channel security processing engine sending the processed data packet to the outgoing data packet selector; and the outgoing data packet selector determining a sending direction for the data packet according to a destination address of the data packet.

\* \* \* \* \*